United States Patent
Diehl et al.

(10) Patent No.: US 6,651,932 B2
(45) Date of Patent: Nov. 25, 2003

(54) DECOMPRESSION UNIT FOR EQUALIZING AN EXPLOSIVE AIR PRESSURE

(75) Inventors: Robert Diehl, Seefeld-Hechendorf (DE); Joachim Barsch, Altheim/Alb (DE); Gordon Falk, Hamburg (DE)

(73) Assignee: Aircabin GmbH, Laupheim (DE)

( * ) Notice: Subject to any disclaimer, the term of this patent is extended or adjusted under 35 U.S.C. 154(b) by 0 days.

(21) Appl. No.: 10/311,608

(22) PCT Filed: Jun. 28, 2001

(86) PCT No.: PCT/DE01/02425
§ 371 (c)(1),
(2), (4) Date: Dec. 16, 2002

(87) PCT Pub. No.: WO02/00500
PCT Pub. Date: Jan. 3, 2002

(65) Prior Publication Data
US 2003/0168553 A1 Sep. 11, 2003

(30) Foreign Application Priority Data
Jun. 29, 2000 (DE) .......................... 100 31 714

(51) Int. Cl.[7] .................................. B64C 1/14
(52) U.S. Cl. ..................... 244/129.1; 244/129.5; 244/118.5; 49/141; 49/31; 292/DIG. 4
(58) Field of Search .................. 244/118.5, 129.1, 244/129.4, 129.5; 49/141, 31; 484/331; 52/98; 292/DIG. 4

(56) References Cited

U.S. PATENT DOCUMENTS

| 3,481,076 A | * | 12/1969 | Bedard ........................ 49/141 |
| 3,938,764 A | | 2/1976 | McIntyre et al. |
| 4,042,193 A | * | 8/1977 | Cerne ....................... 244/129.1 |
| 4,049,221 A | | 9/1977 | Fountain |
| 4,269,376 A | | 5/1981 | Haux et al. |
| 4,308,695 A | | 1/1982 | Ehrsam |
| 4,383,666 A | | 5/1983 | Allerding et al. |
| 4,703,908 A | | 11/1987 | Correge et al. |
| 5,048,239 A | | 9/1991 | Filitz et al. |
| 5,085,017 A | | 2/1992 | Hararat-Tehrani |
| 5,606,829 A | | 3/1997 | Hararat-Tehrani |
| 6,273,365 B1 | | 8/2001 | Hiesener et al. |

FOREIGN PATENT DOCUMENTS

EP  0420306  4/1991

* cited by examiner

Primary Examiner—Galen L. Barefoot
(74) Attorney, Agent, or Firm—W. F. Fasse; W. G. Fasse

(57) ABSTRACT

The invention relates to a decompression unit for equalizing an explosive air pressure between pressurized areas of an aircraft, which have different air pressure conditions and are separated by a wall structure. An air chamber, whose shape alters by contraction (1), is located inside an exterior zone of the cabin (6) and is subjected to an ambient air pressure (p1), said chamber constituting the decompression unit in concrete terms. The wall of the air chamber (1) is perforated. The air chamber is mounted in the vicinity of the periphery of an air pressure equalization flap (2), which is fixed inside an air equalization cavity (9). Said air chamber is connected to a locking device (4), which likewise fixes the air pressure equalization flap in the air equalization cavity.

7 Claims, 3 Drawing Sheets

DECOMPRESSION UNIT FOR EQUALIZING AN EXPLOSIVE AIR PRESSURE

Figure 1:
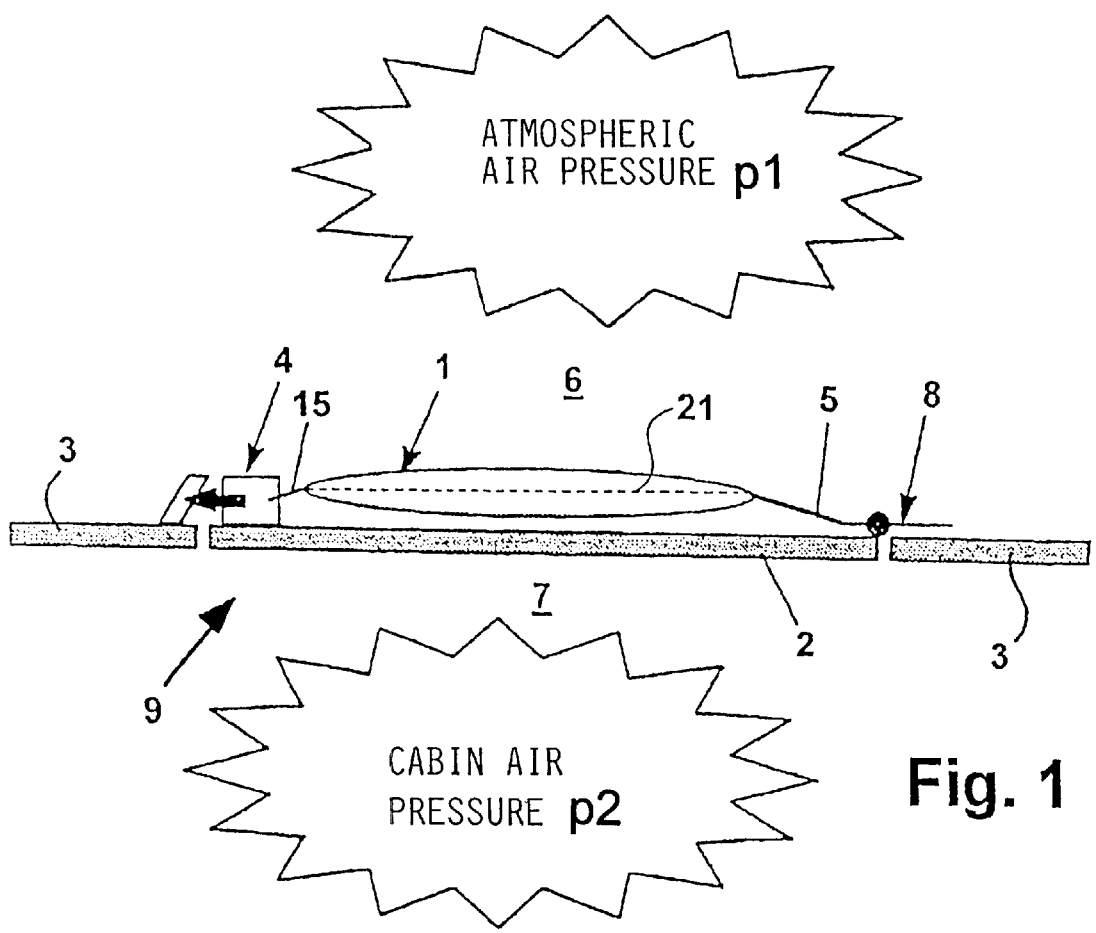

ACCURATE LITERAL TRANSLATION OF PCT INTERNATIONAL APPLICATION PCT/DE 01/02425, AS FILED Jun. 28, 2001 (WO 02 00500 A1)

The invention relates to a decompression unit for equalizing an explosive air pressure between pressurized areas of an aircraft with different air pressure conditions. The different areas are separated from one another by a wall structure.

Since the seventies of the 20$^{th}$ century pressurized cabins of commercial aircraft are equipped with a system for the rapid equalization of the air pressure in the individual aircraft areas so that a sudden pressure drop in the affected area cannot lead to a failure of flight critical structures or systems. A large capacity commercial aircraft, a so-called wide body aircraft, has, as is known, a large volume in the passenger cabin area above the floor as well as in the freight area below the floor, whereby the venting cross-sectional area for the decompression air flow between these aircraft areas will be several times larger compared to the venting grid cross-section required for the normal venting.

System configurations are known wherein respective air slot pressure equalization openings or pressure equalization flaps are used. These systems are, as a rule, installed in the floor covering or in the floor area of the respective aircraft areas in order to provide additional air flow cross-section. A wide body commercial aircraft comprises more than one hundred of these so-called decompression units, one of which unit is installed for each aircraft window area. Such air slot pressure equalization openings are easily installed, whereby, however, the carry-on baggage of an aircraft passenger or other onboard kitchen articles can easily block these pressure equalization openings. Thus, these openings are considered to be undesired lay-out elements.

In actual lay-outs for wide body aircraft actuating flaps are used for an enforced ventilation of the airstream entering behind the pressure equalization flap as a so-called air return flow duct of the normal cabin venting. The individual flap will react in response to a given pressure difference present between the air return flow duct on the one hand and the low pressure level of the air below the cabin floor on the other hand. The flap will open in the direction outwardly, that is in the direction of the lower air pressure. For this purpose the locking bars which so far was locked to hold the flap within the structure surrounding the flap, is released or unlocked, whereby the pressure equalization flap is pressed outwardly, namely it is lifted off the surrounding structure so that now the excess cabin pressure can escape and a pressure equalization can take place.

In this type of decompression unit only components are used having a fine adjustment characteristic and a large surface area for achieving their purpose. These known constructions with pressure equalization flaps for decompression purposes are uniformly hard to classify, whereby due to their complicated construction additionally a respective effort and expense must be taken into account for the maintenance and undesired repairs.

In view of the above it is the object of the invention to improve a decompression application as defined above in such a way that a pressure equalization plate is equipped with a suitable mechanism which can also be retrofitted without a large effort and expense, which mechanism holds the pressure equalization plate during normal flight and also when an unintended loading or adjustment of the effective range due to diverse air passenger loads occur, in the structure surrounding the pressure equalization plate. Thereby it is required (compared to air passenger loads), that occurring low pressure loads do not cause the opening of the pressure equalization flap. However, the mechanism shall react to suddenly occurring small cabin air pressure changes. During the normal cruising flight including ascending and descending flight of an aircraft the mechanism shall be resistant to gradually changing air pressure conditions in the space of the respective aircraft area. More specifically, the mechanism shall not be sensitive to gradual small changes of the desired air pressure conditions. Additionally, the mechanism shall be independent of the size and shape of the pressure equalization flap. Moreover the mechanism shall work reliably while not using external energy sources. Furthermore, the improved decompression device as compared to actual system lay-outs shall provide a contribution to a weight reduction as compared to decompression function units operating solely for the purpose of decompression.

Figure 2:
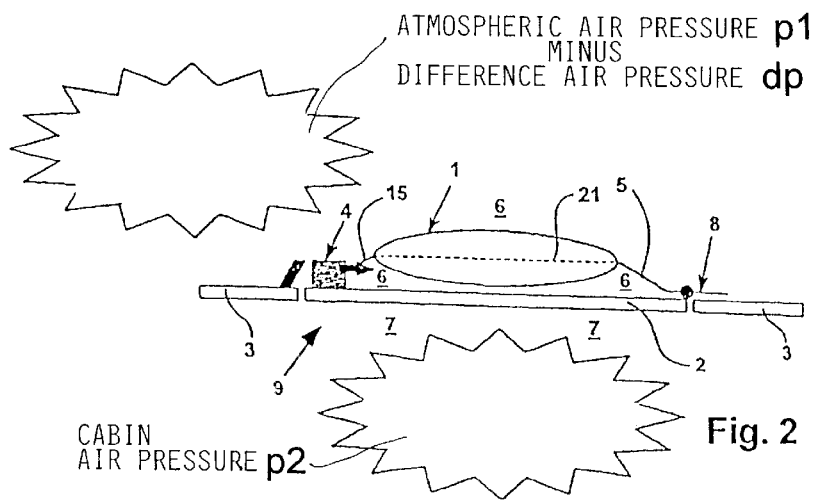
Figure 3:
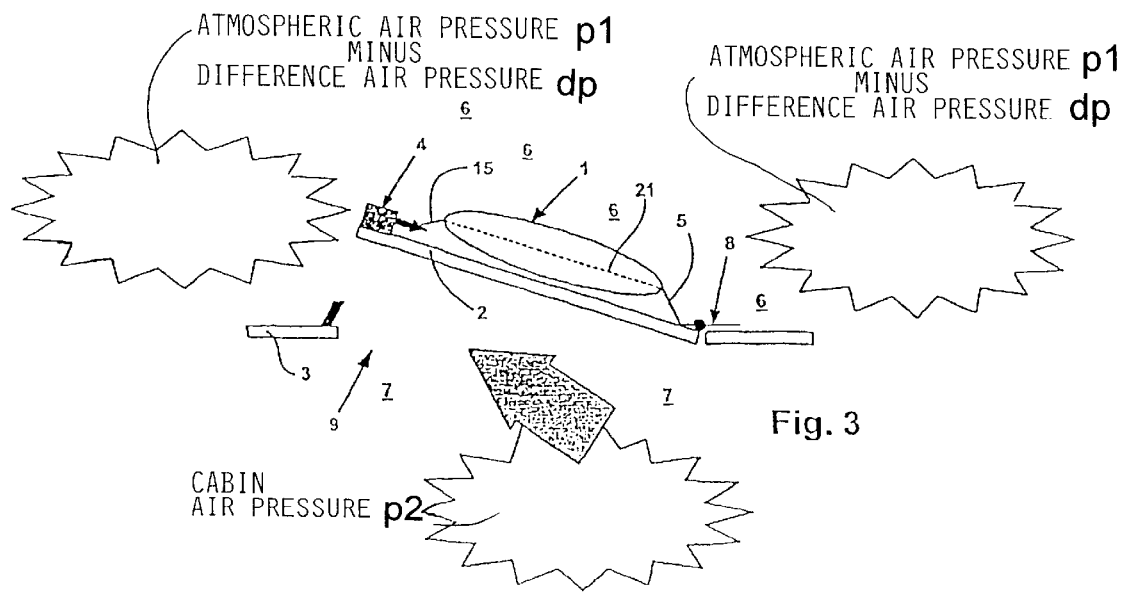
Figure 4:
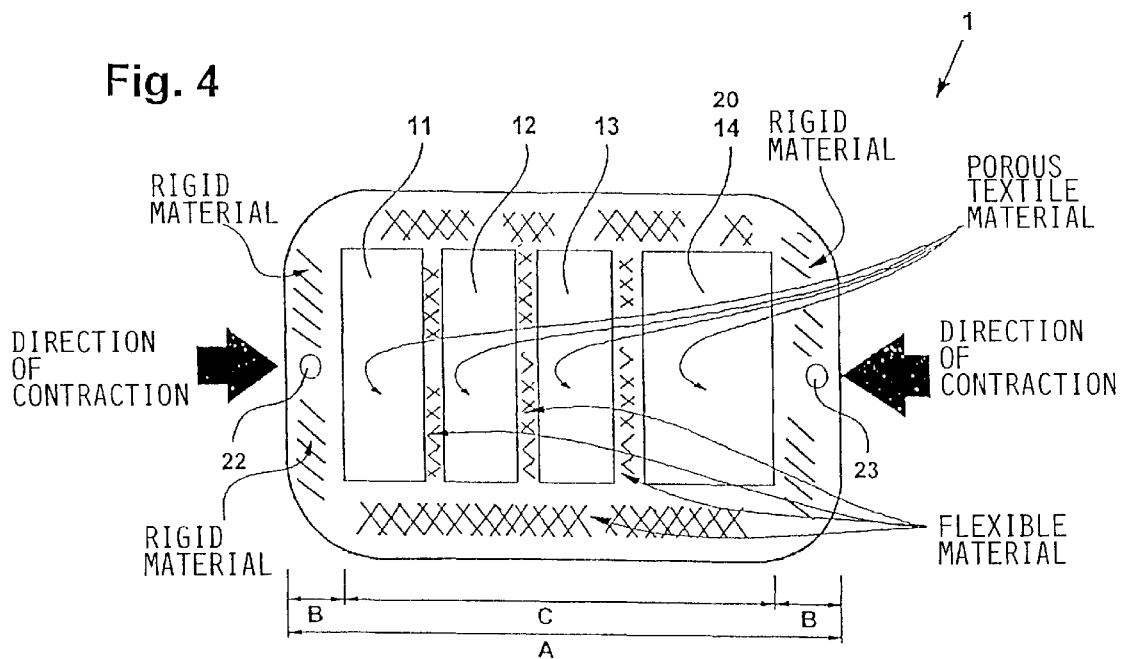
Figure 5:
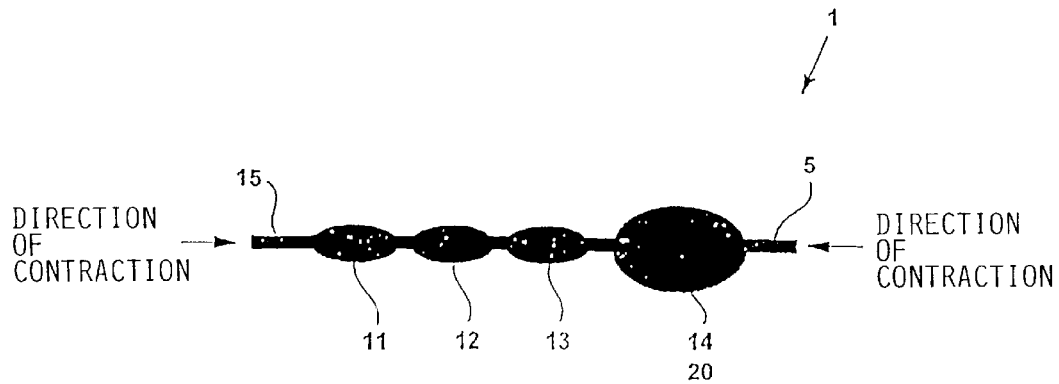

The object is achieved by the features defined in claim 1. In the further claims suitable embodiments and modifications of these features are defined. The invention is described in an example embodiment with reference to the accompanying drawings which show:

FIG. 1 a decompression unit for the explosive air pressure equalization by a pressure equalization flap held in the wall structure when the air pressure ratio is equalized between pressurized areas of an aircraft;

FIG. 2 the deformed decompression unit of the pressure equalization flap which is still held in the wall structure according to FIG. 1 when the external pressure has dropped;

FIG. 3 the pressure equalization flap with the deformed decompression unit according to FIG. 2 in the wall structure in its open state;

FIG. 4 shows a plan view of the decompression unit divided into several individual chambers; and FIG. 5 is a side view of the decompression unit according to FIG. 4, wherein the several individual chambers are connected in series.

To start with, it assumed that the decompression unit comprises an air chamber 1, the inner space of which is divided into several individual chambers 11, 12, 13 and 14 for the reasons described below with reference to FIG. 4. The individual chambers are connected in series with one another. The present air chamber 1 or the individual chambers 11, 12, 13 and 14 shown in FIG. 4 represent for the viewer respective hollow bodies having a variable configuration. These chambers are made of a suitable material that is porous or perforated and is variable in its shape. This porous or perforated material is made stiff in the plane of the chamber wall, but flexible in other directions. It is suggested that textile woven material is used which is sufficiently air permeable. Due to the given air permeability of the chamber wall or walls the individual chamber will suck air under certain air pressure conditions prevailing outside the chamber wall. Further, the chamber will change its shape or configuration in the above mentioned directions by contraction. The air pressure conditions will be described in more detail below.

The decompression unit shown in FIG. 1 relates to a single air chamber 1 having a flat body shape. The air chamber 1 made of a textile woven fabric material comprises a plurality of perforations through the chamber wall. These perforations are not shown. This also applies to the other chambers relative to FIGS. 4 and 5.

Each perforation comprises a defined, effective cross-sectional area. The effective perforation area is determined for each individual area or for the entire area of the surface of the perforated chamber wall. The entire perforation surface area integrates several individual areas and is determined to assure a sufficient air permeability. and thus a sufficient contraction of the air chamber 1 according to FIGS. 2 and 3 and also of the working chambers 11, 12, 13 and 14 according to FIGS. 4 and 5.

Referring again to FIG. 1 it is noted that the decompression unit as incorporated by the air chamber 1 for the explosive air pressure equalization is mounted near the periphery of an air pressure equalization flap 2 which is mounted in the structure surrounding the flap. The surrounding structure is formed by a wall structure 3 in which there is at least one pressure equalization opening 9 which opening is closed by the air pressure equalization flap 2. This wall structure 3 which is formed by a separation wall, separates two pressurized areas from each other. The pressurized areas have different air pressure conditions and relate, for example to a cabin inner space 7 and a space 6 outside the cabin. Thereby, the lower flat surface area of the air chamber 1 rests substantially on the surface of the air pressure equalization flap 2 which faces toward the space 6 outside the cabin. The flat surface facing the flap 2 extends along the chamber longitudinal axis 21 and is shown in its not yet contracted state. The attachment of the air chamber 1 as shown in FIG. 1, is accomplished by a connection element 5, 15 which is not expandable and is formed at the body ends where the flattening ends. The free end of a first connecting element 5 is secured either on the air pressure equalization flap 2 itself or with a sufficient spacing on the wall structure 3 or on a space element close to the flap 2 but not shown in the space 7 outside the cabin. (Note: space outside cabin 6 in FIG. 1). On the one hand, in practice the air pressure equalization flap 2 is connected on one side by a joint 8 or hinge positioned on the edge of the pressure equalization opening 9. Thus, the flap 2 is supported relative to the wall structure 3 such as a separation wall in a rotatable manner. Therefore, on the other hand, the flap 2 is generally secured at its opposite free flap end, that is at the flap edge, to a locking mechanism 4. Thus, this flap end is held in place by a locking bar of the locking mechanism 4 constructed as a latching unit, in the wall structure 3 surrounding the flap when the pressure equalization opening 9 is in its closed state as indicated by the arrow. It is now provided that the free end of a nonexpandable second connection element 15 is connected with the locking mechanism 4, in order to free the air pressure equalization flap 2 out of its securing. This is achieved by contraction of the air chamber 1 which thereby changes its air chamber configuration in the above mentioned directions thereby freeing the locking bar not shown. It is mentioned additionally that the secured connecting elements 5 and 15 may be installed with a certain biasing force which, however, does not impair with the securement by the locking bar.

In the following the question will be answered how the present decompression utilization will perform the release of the air pressure equalization flap 2 out of the interlocking due to the intended pressure equalization between aircraft areas positioned next to each other and dependent on the situation. The unlocking shall be independent of the shape and size of the air pressure equalization flap 2. The flap shall operate without an externally referenced provision of aircraft internal energy sources.

Generally speaking, the space 6 outside the cabin 6 is exposed to an ambient air pressure p1 and the cabin inner space 7 is at a cabin pressure p2. According to FIG. 2 equalized air pressure conditions are present between these two aircraft areas which means that the ambient air pressure p1 is equal in its value to the cabin air pressure.

Contrary thereto, the situation according to FIG. 2, takes into account unequalized pressure conditions between the two above mentioned aircraft areas. In this situation the ambient air pressure p1 in the space 6 outside the cabin will have dropped by a differential air pressure value dp. According to the material characteristics of the air chamber 1 (and taking into account the above discussed general considerations), the latter will change its body shape in response to a sudden drop of the ambient pressure p1. With the pressure drop in the space 6 outside the cabin, that is also in the surroundings of the air chamber 1, a reduced pressure will occur. As a result, a respective air volume will be sucked through the perforations of the chamber wall into the hollow space of the air chamber 1, whereupon the flexible material (fabric type) chamber wall will change its outer shape due to the filling with air. More specifically due to the mentioned material characteristic of the air chamber, the air chamber will change its shape by contraction. Thus, when the air pressure surrounding the air chamber 1 correspondingly drops so that it falls below the cabin air pressure p2, the air chamber 1 will change from its flat body shape that was present when there was pressure equalization between the pressures p1 and p2, to a round shape having a prism type chamber cross-section due to swelling. Thereby, the air chamber 1 will contract in the directions which extend rectangularly to the direction in which the chamber volume increases. On the other hand, the air chamber 1 will increase its size due to the air volume increase in the remaining chamber areas which do not contract in the direction extending across the chamber longitudinal axis 21 to thereby increase its hollow space.

FIG. 3 shows to the person of ordinary skill the following. The above described operation according to FIG. 2 transmits an area distributed pressure onto the surface of the air pressure equalization flap 2 due to the contraction that is taking place with the simultaneously occurring shape change in the air chamber 1 and due to the contact of the flap 2 with the air chamber 1 with the surface areas of the air chamber 1 that changed their shape in the direction of the chamber longitudinal axis 21. As a result, a defined tension force is developed which is transmitted through the connection elements 5 and 15, connected to the chamber, onto their further connection end areas.

The tension force that is transmitted through the first connection element 5 will not endanger the securement of the first connection element 5 on the air pressure equalization flap 2 or on the wall structure 3 or on a space element within the space 6 outside the cabin. The mentioned space element is positioned close to the air pressure equalization flap 2 or close to the air chamber 1. Contrary thereto the tension force transmitted through the second connection element 15 onto the locking mechanism 4 or on the latching unit will be sufficient to loosen the locking bar in the direction of the arrow, whereby the air pressure equalization flap is released from its locked status. As a result, the flap is opened into the space 6 outside the cabin by the cabin air pressure p2 effective on the backside surface of the flap 2. Since the locking bar is operated by the contraction of the air chamber 1 a pressure equalization is taking place between the two cabin areas through the now opened pressure equalization opening 9.

FIG. 4 shows a plan view of an embodiment of the air chamber 1 shown in FIG. 1, whereby this air chamber embodiment corresponds to a construction of an air mattress. Thus, the hollow space or inner space of the air chamber 1 provided as a decompression unit, is divided into several individual chambers 11, 12, 13 and 14, whereby the chamber subdivided hollow spaces are not in air communication with another. As mentioned, the perforation of the chamber wall and the selection of material corresponds to the above described facts. Holes 22 are provided for the securing or for the mechanical connection of this type of air chamber. These holes 22 pass through the cross-section of the lateral margin. One hole 22 is positioned close to the individual chamber 11 which is equipped with a smaller volume expansion. This one hole 22 is provided for the connection to the locking mechanisms 4, more precisely to the locking bar of the locking bar unit. The remaining hole 23 which is positioned oppositely and close to an individual chamber 14 equipped with a larger volume expansion, is provided for the connection to the air pressure equalization flap 2 or to the wall structure 3. It is assumed that a space element close to these elements is excluded. It is further shown in this Figure. by the arrows which indicate the direction of contraction of the decompression unit constructed as a multichamber air chamber. Thereby, the individual chambers 11, 12, 13 and 14 form a multichamber air chamber in order to optimize the force transmission or positional change of this multichamber air chamber onto the air pressure equalization flap 2 and in correlation to the locking mechanism 4, more precisely to the locking bar of the locking bar unit. In this chamber structure the individual chambers 11, 12, 13 and 14 form a certain number of discrete hollow spaces which, as mentioned are not in communication with one another. A suggestion for the type of material to be used in the multichamber air chamber is mentioned with reference to FIG. 4. The process of contraction of the multichamber air chamber takes place in accordance with the above described sample sequence of the individual air chamber 1 with reference to FIGS. 1 to 3 so that the contracting effect of the respective individual chambers 11, 12, 13 and 14, namely the air chambers will take place for the intended purpose. Additionally, the attentive viewer of FIG. 4, taken in correlation with FIG. 5 will generally glean that one of the two outer chambers 11, 14 has a clearly larger chamber cross-section in its contracted state compared to the remaining individual chambers 12, 13. The chamber 20 will be used as an air chamber container.

FIG. 5 shows a side view of the embodiment according to FIG. 4, whereby it is emphasized that in this embodiment no air connection exists between and among the individual chambers 11, 12, 13 and 14. Due to the expansion of the individual air chambers a contraction of the entire so-called air mattress takes place, whereby in accordance with this illustration in comparison to a view of FIG. 4, a reduction of the structural length A of the mattress body by the length B to the contracted length C already occurred. Due to the sequential arrangement of the individual chambers 11, 12, 13 and 14, respectively 20, the contracted length is larger than that of but one air chamber. That means, that the contraction velocity is larger with several air chambers connected in series than in one air chamber.

Due to individual chambers 11, 12, 13 and 14 (air chambers) of different sizes, it is thus possible to realize different reaction paths. In the same way the contraction reaction time is influenceable.

For the sake of completeness several useful modifications of described explosive decompression unit, as far as not yet described, will be indicated in order to make these useful for being put into service or under various operating conditions to be taken into account. These will be discussed in the following.

The chamber is or chambers are intentionally so constructed that the air exits slowly and thereby the chamber does not swell, and so that therefore the locking mechanism 4 or locking bar unit will not be operated, so that the limited working medium volume is not exhausted, when during normal flight operation of the aircraft changes occur in the level of the cabin air pressure p2 in the cabin interior area 7 and in the ambient air pressure p1 in the space 6 outside the cabin. These changes last, as a rule, for several minutes.

Depending on the degree of permeability, on the ambient conditions. and on the required closed loop control, it is possible to achieve the required permeability characteristic in that, as mentioned, a porous fabric is used for the individual chamber or in that several perforations are provided in the chamber wall.

The compression unit may be built from several individual air chambers 11 to 14 that work in sequence in order to amplify the positional change. The typical welding or adhesive bonding seam at the chamber margin provides connections which, if necessary, may be reinforced by a lamination and/or by eyelets.

It is suggested to produce the air chambers from suitable materials having a long storage life, for example material that is customarily used in the aviation branch such as fabric material which is produced in accordance with known production or manufacturing methods for making life vests, emergency chutes or air rafts or similar materials officially permitted. The porous material is similar to or as strong as that of an airbag which are used in the car manufacturing industry. A qualification for the aviation area may eventually be necessary.

The locking bars of the so-called locking bar unit shall be so constructed that only a small energy supply is required for the unlocking or opening of the locking bar, whereby it is not absolutely necessary that the locking bar unit after the unlocking of the air pressure equalization flap 2 is maintained opened. Therefore, it is suggested to use a flip lock or a bi-stable lock or simply merely an arresting snap lock for the locking.

A repeatable locking bar operating force (locking) will improve the reliability of the present decompression unit in that an inadvertent locking bar operation or locking is prevented in case the unit is intended for operation at low pressure differences.

Furthermore, referring to the construction and the function of the decompression unit, it is further added, as far as not yet clearly emphasized, that the individual inflatable air aspirating air chamber 1 relative to the other chambers, is made of the same textile woven material which is confirmed, as mentioned, to be stiff and rigid in the substantially flat plane of the chamber wall and has flexible characteristics in the other directions. The body shape of the air chamber permits changing its body shape with a gaseous medium, such as air, by contraction for the intended purpose to vary its volume. The air chamber 1 and the other present chamber types operate under the principle according to which the surface area of the chamber remains effectively constant so that the expansion force or respectively the positional change of the chamber due to the pressure that is provided by the medium, here air, is directly transformed into a contraction force or length change at or near the pressure equalization flap 2. The contraction force or length change extends at about a right angle to the direction of the original or first expansion.

Further, the decompression unit develops an expansion force due to the following capability, namely the above mentioned change of the geometric body proportions of the individual air chamber 1 or of the arrangement of individual chambers 11 to 14, respectively 20. These chambers may be connected either in series or in parallel or even in a mixed connection due to the position of their connection possibilities. The expansion force causes the transmission of the contraction force or of the summed-up contraction forces to the air pressure equalization flap 2 by changing its physical position. The summed-up contraction forces form a uniformly effective contraction force. It is the purpose of these measures that the force transmission to the air pressure equalization flap 2 is achieved without further components such as levers or rod links.

In comparison to conventional products, the main advantages of the decompression unit for rationalizing the pressure equalization between pressurized aircraft areas, are seen in that one will use an independently working air volume in an efficient pressure container, that is the air chamber 1, which works independently of an air return flow duct that is conventionally connected to the pressure container. Further, the material, the volume and the shape of the air chamber can be optimized for the decompression sensitivity or the reliability, whereby the air chamber 1 will have a minimal size and a minimal weight. Besides, a small inertia and a rapid system reaction is achieved. Simplicity, low costs for the production, and during use, as well as a high reliability are further advantageous characteristics of the air chamber or air chambers that are worth mentioning. The present solution works independently of the shape and size of the pressure equalization flap 2 or of the aircraft structure in which the flap 2 is installed. Thus, the present solution can be used in other aircraft types and differently equipped aircraft without the need for certain modifications of respective components. The decompression unit can be separately certified, whereby all improvements which are not related to the decompression can be made without expensive permitting activities for the component: decompression to be tested.

A function testing for the certification or for the satisfaction of current air worthiness requirements can be finished with a small testing apparatus, namely a syringe without any substantial effort and expense.

Finally, it is mentioned that compared to known decompression applications the use of the present decompression unit including its modified embodiment for the equalization of the air pressure between pressurized spaces for aviation applications, achieves a substantial weight, volume and complexity reduction including cost savings. The application of the present solution is not limited to aircraft manufacturing. Its use is always then beneficial when for certain solutions the force transmissions of a contracting body due to the pressure of a stored medium, becomes sensible in order to achieve the body position of another body by the force action. Thus, this fact will be of special interest if one intends to produce a direct tension force without a large effort and expense, whereby one can do without the intermediate use of other structural components such as levers or link rods.

What is claimed is:

1. Decompression unit for the explosive air pressure equalization between pressurized areas of an aircraft with differing air pressure conditions, wherein the areas are separated by a wall structure (3) in which there is at least one pressure equalization opening (9), wherein the pressure equalization opening (9) is closed by an air pressure equalization flap (2), and wherein the latter is connected with a locking mechanism (4) secured to the wall structure (3), whereby the locking mechanism (4) holds the air pressure equalization flap in the pressure equalization opening (9), characterized in that within a space (6) pressured by an ambient air pressure (p1) outside a cabin, there is arranged an air chamber (1) that changes itself by contraction and forms the decompression unit and which has a perforated wall which is secured in the vicinity of the periphery of the air pressure equalization flap (2) and which is connected with the locking mechanism (4).

2. Decompression unit according to claim 1, characterized in that the air chamber (1) is a substantially flat body that extends along a chamber longitudinal axis (21), said flat body having body ends at the ends of the flattening, at which ends a connection element is formed which is not capable to expand, wherein a first connection element (5) is secured to the air pressure equalization flap (2) or to the wall structure (3) or to a space element close to the air pressure equalization flap, and wherein a second connecting element (15) is connected with the locking mechanism (4).

3. Decompression unit according to claim 1, characterized in that the inner space of the air chamber (1) is divided into several individual chambers (11, 12, 13, 14).

4. Decompression unit according to claim 3, characterized in that the air chamber (1) or the individual chambers (11, 12, 13, 14) change their shape in response to changing pressure conditions in such a way that the individual chamber, under the influence of a falling ambient air pressure (p1) which is below a cabin air pressure (p2) within a cabin inner area (7) that is separated or bulkheaded by the wall structure (3), has or have the ability to change its or their substantially flat body shape due to the contraction that starts at the body ends and travels toward the body center, whereby the body shape in its end status when the cabin pressure (p2) is larger than the ambient pressure (p1), is a round swollen thick body shape with a chamber cross-section resembling an ellipsis or a barrel resembling body shape.

5. Decompression unit according to claim 4, characterized in that the individual air chamber (1) or the individual single chamber (11, 12, 13, 14) in its contracted end position or state is arranged to lie with its outer chamber surface on the flap surface of the air pressure equalization flap (2) that faces toward the cabin outer area (7), and a sufficient tension force of the two connecting elements (5, 15) is developed by the air chamber (1) or by the outer positioned individual chambers (11, 14) of the serially connected individual chambers (11, 12, 13, 14) due to the chamber growth by contraction so that an opening or actuation of the locking mechanism (4) is achieved through the second connecting element (15).

6. Decompression unit according to claim 3, characterized in that one of the outer positioned individual chambers (11, 14) has in its contracted final state an enlarged chamber cross-section compared to the remaining individual chambers (12 and 13) and that it is used as air chamber container (20).

7. Decompression unit according to claim 3, characterized in that the individual chambers (11, 12, 13, 14) are connected in series without an air communication.

* * * * *